UNITED STATES PATENT OFFICE.

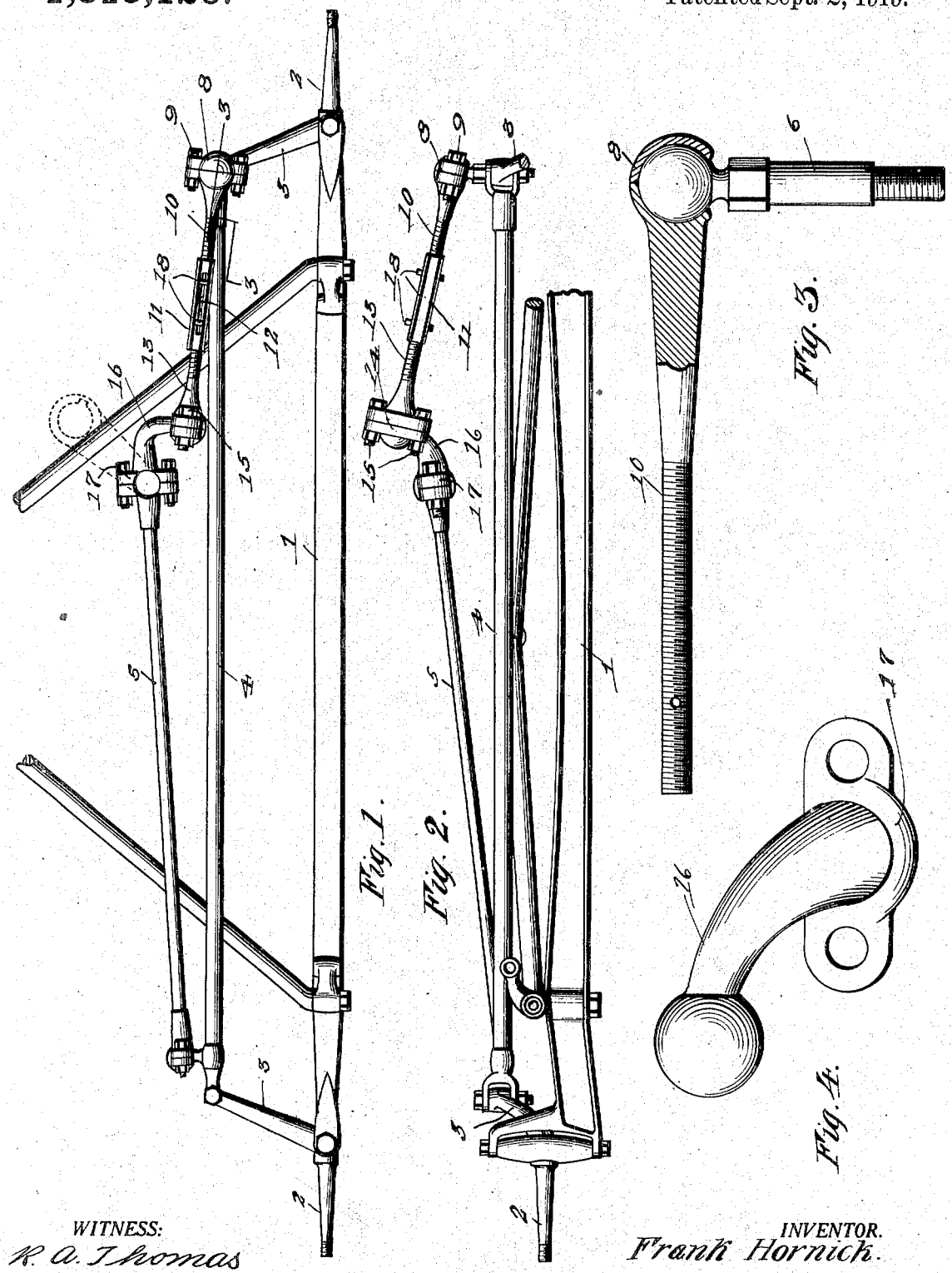

FRANK HORNICK, OF JOHNSTOWN, PENNSYLVANIA.

AUTO ATTACHMENT.

1,315,126.  Specification of Letters Patent.  Patented Sept. 2, 1919.

Application filed February 12, 1919. Serial No. 276,621.

*To all whom it may concern:*

Be it known that I, FRANK HORNICK, a citizen of the United States, residing at Johnstown, in the county of Cambria and State of Pennsylvania, have invented new and useful Improvements in Auto Attachments, of which the following is a specification.

This invention relates to means for bracing the steering mechanism of automobiles and the principal object of the invention is to provide means for connecting the end of the short connecting rod, where it is attached to the steering post, to the end of the spindle-connecting rod.

Another object of the invention is to provide means for making the parts which connect the short rod with the spindle-connecting rod adjustable.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the steering means of an automobile with my invention attached thereto;

Fig. 2 is a front view;

Fig. 3 is a section on line 3—3 of Fig. 1;

Fig. 4 is a detailed view.

In these views 1 indicates the front axle of an automobile to which the spindles 2 are pivotally connected as usual. The spindle arms 3 are connected together by the rod 4 and said rod 4 is connected with the steering post by the rod 5. All these parts are well-known and form no part of my invention.

In carrying out my invention I remove the bolt which connects one end of the rod 4 with one of the arms 3 and replace it by a bolt 6 which is provided with a spherical head 7. This head is engaged by a socket 8 which is formed of two parts which are connected together by the bolts 9. One part is carried by a screw-threaded arm 10. This arm engages the screw-threaded bore of a hexagonal sleeve 11. This sleeve is provided with the diametrically arranged slots 12. A second screw-threaded arm 13 engages the other end of this sleeve and the other end of this arm carries one part of a socket member 14, the other part of said member being bolted to the first part by the bolts 15. This socket member receives the rounded end of an angle arm 16. The other end of this arm is formed into a half socket 17 so as to replace the usual half socket located on the inner end of the rod 5 and acting to connect said rod with the steering post as shown in dotted lines in Fig. 1. It will thus be seen that the socket end of the arm 16 connects the steering post to the connecting arm 5 so that both ends of this rod 5 are connected with the spindle-connecting rod 4. The arms 10 and 13 and the collar 11 act as a turnbuckle and the parts may be held against turning when once adjusted by means of the collar pins 18 passing through the slots 12 and holes in the arms 10 and 13.

My invention will prevent the short rod from turning up when a sudden and short turn to the left is made and it acts to stiffen and brace the whole steering mechanism. The device will also act to prevent rattling of the parts of the steering mechanism.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the spindle connecting rod and the steering gear connecting rod of an automobile, of an angle arm connected with that end of the steering gear connecting rod which is connected with the steering gear and links adjustably connected together connecting said arm with the end of the spindle connecting rod where it connects with the spindle arms.

2. In combination with the spindle-connecting rod and the steering gear-connecting rod of an automobile, of an arm connected with the inner end of the last mentioned rod, a screw-threaded arm, ball and socket means connecting said arms together, a sleeve having a screw-threaded bore engaged by said screw-threaded arm, a second threaded arm engaging said bore and ball and socket means connecting said second arm with the spindle-connecting rod.

In testimony whereof I affix my signature.

FRANK HORNICK.